(12) United States Patent
Yang et al.

(10) Patent No.: US 12,020,189 B2
(45) Date of Patent: Jun. 25, 2024

(54) DEPARTURE TIME PLANNING OF SHARED RIDES FOR CONGESTION MITIGATION

(71) Applicant: Toyota Motor Engineering & Manufacturing North America, Inc., Erlanger, KY (US)

(72) Inventors: Hao Yang, Aliso Viejo, CA (US); Kentaro Oguchi, Mountain View, CA (US)

(73) Assignee: TOYOTA MOTOR ENG & MFG NORTH AMERICA, INC., Plano, TX (US)

(*) Notice: Subject to any disclaimer, the term of this patent is extended or adjusted under 35 U.S.C. 154(b) by 959 days.

(21) Appl. No.: 16/833,456

(22) Filed: Mar. 27, 2020

(65) Prior Publication Data

US 2021/0304098 A1    Sep. 30, 2021

(51) Int. Cl.
*G01C 21/00* (2006.01)
*G01C 21/34* (2006.01)
*G06Q 10/0631* (2023.01)
*G06Q 10/10* (2023.01)
*G06Q 50/40* (2024.01)

(52) U.S. Cl.
CPC ... *G06Q 10/06312* (2013.01); *G01C 21/3415* (2013.01); *G01C 21/343* (2013.01); *G06Q 10/10* (2013.01); *G06Q 50/40* (2024.01)

(58) Field of Classification Search
CPC .. G06Q 10/06312; G06Q 10/10; G06Q 50/30; G01C 21/3415; G01C 21/343
See application file for complete search history.

(56) References Cited

U.S. PATENT DOCUMENTS 8,744,734 B2    6/2014  Chiu
10,126,138 B1*  11/2018 Farmer .............. G01C 21/3423
(Continued)

OTHER PUBLICATIONS

Fujitsu Laboratories Ltd., Singapore field trail of congestion-mitigation project: applies Zinrai artificial intelligence technology to human behavior, Press Release, Kawasaki, Japan, Nov. 5, 2015 (4 pages).

(Continued)

*Primary Examiner* — Adam M Alharbi
(74) *Attorney, Agent, or Firm* — VLP Law Group LLP; Michel Bohn

(57) ABSTRACT

The disclosure includes a system and method for generating travel itineraries including planning departure times of rides in consideration of congestion mitigation. The system includes a processor configured to receive a ride request requesting transportation to a destination location via a road network and determine an initial travel itinerary for the ride request based on real-time traffic data for the road network, which initial travel itinerary may include an initial departure time. The system may compute an adjusted travel itinerary for the ride request based on a postponed departure time relative to the initial departure time using projected traffic data. In some instances, the system may then generate a data file including the postponed departure time of the adjusted travel itinerary and the initial departure time and may customize the graphical user interface to show graphical elements representing the initial travel itinerary and the adjusted travel itinerary.

20 Claims, 11 Drawing Sheets

(56) References Cited

U.S. PATENT DOCUMENTS

2018/0211186 A1* 7/2018 Rakah .................. G06V 20/593
2019/0051174 A1* 2/2019 Haque ................... G01C 21/34
2019/0265703 A1    8/2019 Hicok et al.
2019/0303806 A1   10/2019 Namba et al.

OTHER PUBLICATIONS

Griswold, Alison, Uber is experimenting with letting riders wait longer in exchange for cheaper fares, https://qz.com/1308173/uber-is-experimenting-with-letting-riders-waitlonger-for-a-cheaper-fare/, Jun. 18, 2018 (5 pages).
Xiao, L., et al., Congestion Behavior under Uncertainty on Morning Commute with Preferred Arrival Time Interval, Journal of Discrete Dynamics in Nature and Society, vol. 2014, pp. 1-9, 2014.

* cited by examiner

DEPARTURE TIME PLANNING OF SHARED RIDES FOR CONGESTION MITIGATION

BACKGROUND

The present disclosure relates to a system for planning departure time of shared rides for congestion mitigation.

In transportation systems, ride sharing or ride-hailing can increase the number of passenger trips on roads thereby increasing the traffic pressure on an entire transportation network. The impact of increased traffic due to ride hailing at high-demand areas, such as airports and transit stations, can be especially pronounced. Ride-hailing services, governments, and other institutions have attempted to decrease the resulting traffic congestion, for example, in these high-demand areas. For instance, some ride-hailing companies offer cheaper fares in exchange for taking rides at a later time; however, these solutions may increase congestion later and cause riders to arrive at their destinations at much later or more inconvenient times without regard for future traffic impact or optimizing rides. Similarly, some solutions encourage commuters to leave at later times or via different transportation modes in order to avoid traffic, but these solutions do not flexibly consider the impact of different types of traffic or different routes and may result in very long wait times. Further, other solutions have attempted to address the delay for ride hailing services by predicting when demand is highest and deploying more resources (e.g., vehicles) at the high-demand time; however, while this solution may address the need for more rides, it floods the transportation network with more traffic thereby causing increased transportation times for each vehicle in the network.

It is desirable to address the limitations of the foregoing approaches.

SUMMARY

The system overcomes the deficiencies of the prior art with technology that generates travel itineraries including planning departure times of rides in consideration of congestion mitigation.

In one implementation, the system includes software, firmware, hardware, or a combination of them installed on the system that in operation causes or cause the system to perform operations, for instance, using a processor, non-transitory storage device, and instructions executed by the processor. According to some implementations, the operations include receiving, by a graphical user interface displayed on a client device, a ride request requesting transportation to a destination location via a road network; determining, by a navigation application communicatively coupled with the graphical user interface, an initial travel itinerary via the road network for the ride request based on real-time traffic data for the road network, the initial travel itinerary including an initial departure time; computing, by the navigation application, an adjusted travel itinerary via the road network for the ride request based on a postponed departure time relative to the initial departure time of the initial travel itinerary using projected traffic data for the road network; generating, by the navigation application, a data file including the postponed departure time of the adjusted travel itinerary and the initial departure time; and customizing, by the navigation application, for display on the client device, the graphical user interface to show a graphical element representing the adjusted travel itinerary.

Implementations may include one or more of the following features: Where receiving the ride request by the graphical user interface displayed on the client device includes determining, by the navigation application, a current location of the client device using a location service of the client device; receiving, by the navigation application, an input identifying the destination location requested for the ride request via the graphical user interface; receiving, by the navigation application, a message indicating a location of a vehicle available for providing rides based on a location of a computing device associated with the vehicle; and determining, by the navigation application, the initial departure time based on the location of the vehicle available for providing rides and the current location of the client device. Determining, by the navigation application, based on a location of one or more vehicles and a departure location associated with the ride request, a vehicle available for providing rides at the departure location and the postponed departure time; and transmitting, by the navigation application to a computing device associated with the vehicle available for providing rides, a notification indicating the adjusted travel itinerary. Where transmitting the notification indicating the adjusted travel itinerary to the vehicle available for providing rides includes determining route guidance data for a particular route, the particular route including a location of the vehicle available for providing rides, the departure location associated with the ride request, and the destination location; and providing route guidance for the particular route to the computing device associated with the vehicle based on the route guidance data. Where determining the initial travel itinerary through the road network for the ride request includes determining one or more routes between a first location and a second location using map data describing the road network; monitoring the real-time traffic data along the one or more routes; determining the initial departure time from the first location; estimating a first travel time of a first route of the one or more routes based on the initial departure time and the real-time traffic data; and determining the initial travel itinerary based on the estimated first travel time. Where the one or more routes include a second route, the first route corresponding to a shared ride and the second route corresponding to a non-shared ride; and determining the initial travel itinerary through the road network for the ride request includes estimating a second travel time of the second route based on the initial departure time and the real-time traffic data. Where computing the adjusted travel itinerary through the road network for the ride request includes adjusting a projected traffic level of the first route based on the postponed departure time of the adjusted travel itinerary; and estimating an adjusted arrival time of the first route of the adjusted travel itinerary based on the adjusted projected traffic level of the first route. Where estimating the adjusted arrival time of the first route is further based an unadjusted projected traffic level of the second route. Where predicting the adjusted travel itinerary through the road network for the ride request includes estimating an effect of the postponed departure time on a projected traffic level in the road network. Where customizing the graphical user interface is performed in response to an estimation, based on the real-time traffic data and the projected traffic level, that the effect of the postponed departure time will be that a future traffic level in the road network will be lower than a current traffic level. Where computing the adjusted travel itinerary through the road network for the ride request includes computing an estimated arrival time of the initial travel itinerary based on the real-time traffic data for the road network; setting a departure delay; computing an estimated adjusted arrival time of the adjusted travel itinerary based on the projected traffic data and the departure delay; determining a defined arrival time offset threshold; determining that the estimated adjusted arrival time satisfies the defined arrival time offset threshold relative to the estimate arrival time of the initial travel itinerary; and setting the postponed departure time using the departure delay. Implementations of the described techniques may include hardware, a method or process, or computer software on a computer-accessible medium.

This document discloses innovative technology for addressing the problems in the Background. Among other benefits, the technology described herein predicts travel times for ride requests using predicted roadway traffic including considering the impact of delayed rides, while decreasing total travel time for vehicles in the transportation network. Implementations of the technology may determine an optimal departure time to both reduce travel time and arrival delay. The technology may take multiple routes and vehicles into consideration in computation of travel itinerary, and may communicate with vehicle computing systems, such as those in autonomous vehicles, to coordinate and execute rides based on the computed travel itinerary.

Some implementations may also improve computer performance by reducing the quantity of information to be retrieved and processed when a route is calculated or recalculated. These and other benefits are described in further detail below.

BRIEF DESCRIPTION OF THE DRAWINGS

The invention is illustrated by way of example, and not by way of limitation in the figures of the accompanying drawings in which like reference numerals are used to refer to similar elements.

DESCRIPTION

Figure 1:
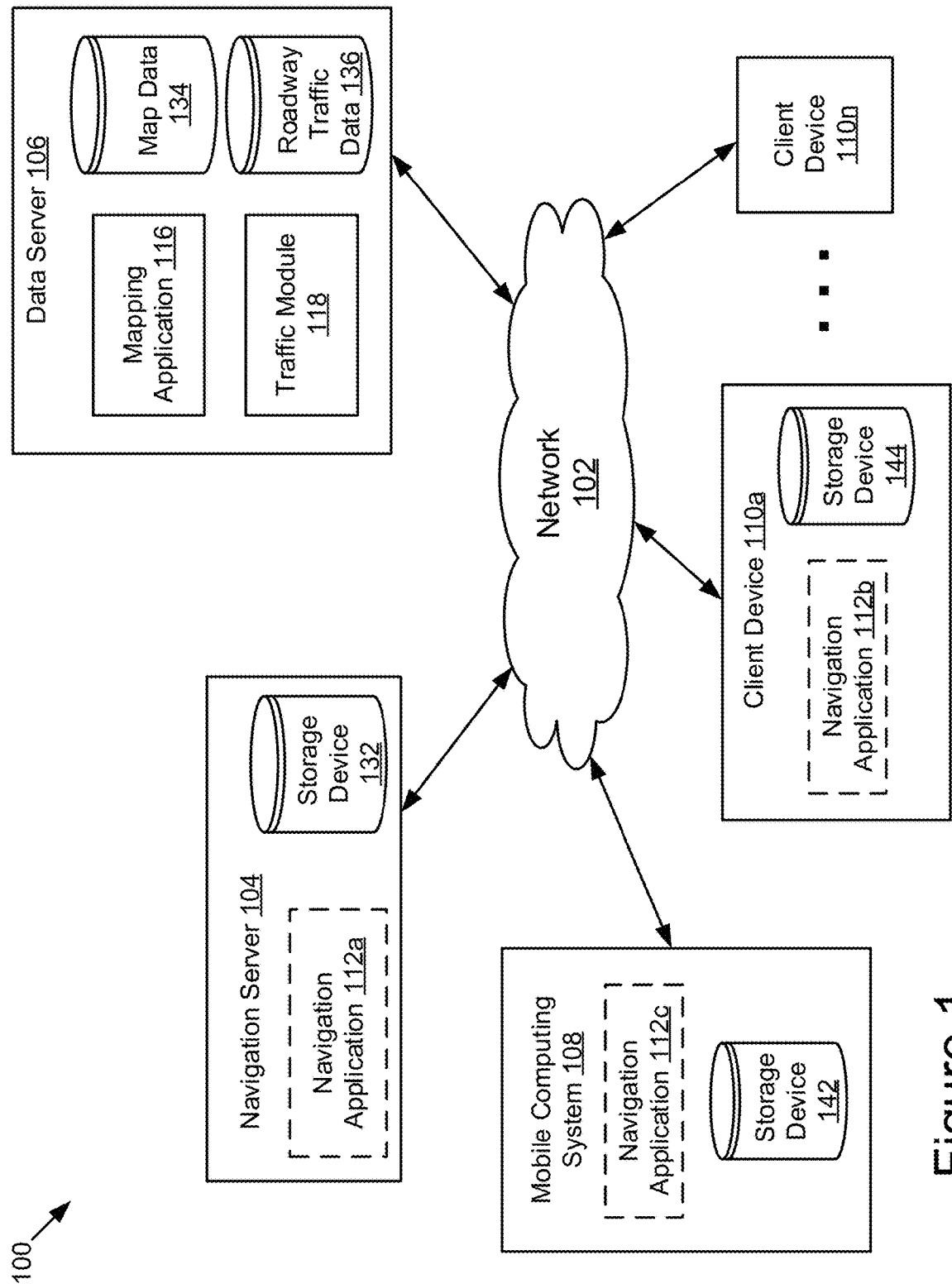
FIG. 1 is a block diagram illustrating an example implementation of a dynamic navigation system for generating improved travel itineraries.

Technology for generating travel itineraries including planning departure times of rides in consideration of congestion mitigation is described below. The technology includes a dynamic vehicle navigation system that searches for the optimal delays for individual trips considering projected roadway congestion. The technology described herein may decrease travel time, increase accuracy in predicting travel time, improve overall transportation network performance, decrease overall bandwidth usage, and reduce consumed computational resources among other benefits described herein.

Implementations of the technology described herein propose a departure-time planning system that monitors traffic in congested areas or at congested times and, when a ride request is received, computes optimal travel itineraries in decrease travel time. In some instances, the technology may, even with a departure delay, allow riders to arrive at destinations sooner than without the delay while improving transportation network performance, for example, by reducing overall roadway congestion on target roads. For example, the navigation application described herein may utilize real-time traffic information in target areas, the amount, timing, and locations of ride requests, predicted congestion from different types of traffic, traffic balancing, ride prioritization, and other factors to reduce congestion levels of the target areas and enable rides to arrive at their destinations potentially earlier by delaying departure times by a certain amount.

For the purposes of this disclosure, a ride (e.g., a shared ride or ride-hailed ride) may be a ride provided by a third-party driver, such as a taxi, ride-hailing service (e.g., Lyft® or Uber®), carpooling service, or shuttle service, or it may be provided by an autonomous vehicle or another service that provides transportation to riders, for example, on demand. While the transportation or ride may be referred to herein as a "shared ride" it does not necessarily need to include other human passengers or drivers, for example, when the ride is provided by an autonomous vehicle.

Shared rides or ride-hailing may increase traffic and roadway congestion especially in high-demand areas, such as airports, transit stations, sports stadiums, etc. While previous solutions did not consider their effect on roadway congestion or, worse, even exacerbated traffic, the navigation application described herein may both improve the requested ride and the congestion of the overall transportation network among other benefits. These improvements may be achieved by, among other things, postponing departure times of certain shared rides. Some implementations of the navigation application may even provide incentives to users to take advantage of delayed departure times.

The navigation application may use real-time, updated traffic information in target areas and a quantity of ride requests to search for optimal departure times for the rides. The technology may predict travel times for ride requests based on predicted, future congestion and may estimate improved travel times based on departure time postponement.

The certain target areas (e.g., areas within a defined range or quantity of roadway segments from high-demand areas) may be intelligently selected based on the existence/quantity of ride requests and other information to reduce computational resources consumed by monitoring all roadways in a transportation system. Further, it should be noted that while departure times are specifically mentioned herein, the technologies may also be applicable to scheduling rides through (e.g., beginning at, passing through, or arriving at) high-demand areas.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is a block diagram illustrating one example implementation of a dynamic navigation system 100 for generating improved travel itineraries. The illustrated system 100 includes a navigation server 104, a data server 106, a mobile computing system 108, and/or a client device 110 communicatively coupled via a network 102, although it should be noted that additional or fewer components may be used.

The navigation application 112 may be operable on one or more of the components 104, 106, 108, and 110 of the system 100. For example, an instance of the navigation application 112a may be operable on the navigation server 104, 112b on the client device 110a . . . 110n, 112c on the mobile computing system 108, or in some instances, the navigation application 112 may be distributed among two or more components of the system 100.

The navigation application 112 may include logic executable for determining routes and/or performing actions described herein. In some implementations, the navigation application 112 retrieves position data associated with a mobile computing system 108, client device 110, or a user. The navigation application 112 may retrieve information from the navigation server 104 and/or the data server 106 (e.g., the mapping application 116, traffic module 118, etc.) to perform its operations, as described herein. For example, the position data describes a geographical position on a map. Example components of the navigation application 112 are described in further detail with reference to FIG. 2.

In some implementations, the navigation application 112 may analyze departure delays, real-time traffic data, predicted traffic data, and/or ride requests to determine impacts on route travel time to develop a dynamic navigation or ride system for devices searching for paths with minimal travel time, lower travel time uncertainties, and roadway congestion balancing. For instance, the navigation application may advantageously reduce congestion levels of high-traffic areas while potentially enabling riders to arrive at their destinations earlier. As described in further detail below, the navigation application 112 (whether alone or in conjunction with other components of the system 100) may monitor traffic (e.g., in certain regions), predict roadway congestion, process ride requests (e.g., in the certain regions), predict travel times using predicted congestion, determine improved travel times based on departure time postponement, and, in some instances, provide interaction via graphical user interfaces with users and/or with computing systems associated with vehicles via application programming interfaces.

In some implementations, the technology described herein monitors traffic and ride requests in certain regions, such as at or near high-demand areas. For instance, the navigation application may determine the certain regions (e.g., their location, size, or other attributes) based on a quantity or density (spatial or temporal) of ride requests received by the navigation application 112. In some implementations, the navigation application 112 may determine the certain region for which to monitor traffic based on a traffic level in a region or a rate at which the traffic level in the region changes. The certain regions may be at or within a defined or determined distance from high-demand areas, such as near sports arenas, airports, theaters, ski resorts, exposition centers, hotels, etc. Further, the navigation application may vary the existence, size, temporal duration, etc., of the monitored locations or high-demand areas based on time of day, rapid changes to traffic, events, construction, etc. These aspects, among others described herein, increase the accuracy of the travel-time estimation while reducing computational complexity, consumed bandwidth, quantity of data calls, and consumed computational resources. Compared with previous systems, the technology consumes fewer processing cycles to estimate and predict traffic conditions, thereby allowing more efficient real-time update of vehicle routes and times.

Some implementations of the navigation application 112 dynamically re-route vehicles in networks to avoid congested regions and to assist the network to better utilize road segments. For example, the system 100 may recalculate route and estimated travel time/estimated arrival time during route guidance to adapt to changing traffic conditions. During these recalculations, the computational benefits described above are further compounded.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 102 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 102 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, or any other wireless networks. Although FIG. 1 illustrates one network 102 coupled to the navigation server 104, the client device(s) 110, the mobile computing system(s) 108, and the data server 106, in practice one or more networks 102 can be connected to these and other entities.

The navigation server 104 can be a hardware or virtual server that includes a processor, a memory and network communication capabilities. In some implementations, the navigation server 104 sends and receives data to and from one or more of the data server 106, the client device 110a . . . 110n, and the mobile computing system 108. The navigation server 104 also includes a storage device 132, which may include registration data for users, routes (e.g. new routes and historical routes), intersections, maps, etc.

In some implementations, the client device 110a . . . 110n sends and receives data to and from one or more of the navigation server 104, the data server 106, or the mobile computing system 108. The client device 110 is a computing device that includes a memory and a processor, for example a laptop computer, a desktop computer, a tablet computer, a mobile telephone, a personal digital assistant, smartwatch, or other computing device. In some implementations, the client device 110*a* includes a browser for accessing online services (e.g., a navigation server 104) and a storage device 144 for storing registration data for users, routes, intersections, maps, location information, etc. In some implementations, as described in reference to FIG. 2, the client device 110 may include position locating capabilities, such as a Global Positioning System (GPS) receiver, Wi-Fi radio, cellular radio, or other device for determining its location.

In some instances, a navigation application 112 acts in part as a thin-client application that may be stored on the client device 110 and in part as components that may be stored on the navigation server 104. For example, the navigation server 104 may store the user data in the storage device 132 and estimate a route for the user.

In some implementations, the mobile computing system 108 sends and receives data to and from one or more of the navigation server 104, the data server 106, and the client device 110. The mobile computing system 108 is any computing device that includes a memory and a processor. In one implementation, the mobile computing system 108 is may comprise any vehicle or any other mobile system with non-transitory computer electronics (e.g., a processor, a memory or any combination of non-transitory computer electronics). Examples include a car, plane, boat, truck, bionic implant, robot, personal transport device, commercial transport device, etc. In some implementations, the mobile computing system 108 includes a storage device 142 for storing registration data for users, routes, intersections, maps, etc. In some implementations, as described in reference to FIG. 2, the mobile computing system 108 may include position capabilities, such as a GPS receiver, Wi-Fi radio, cellular radio, or other device for determining its location.

The data server 106 may include a mapping application 116, a traffic module 118, map data 134, and roadway traffic data 136, for example. In the illustrated implementation, the data server 106 is connected to the network 102 via which it may communicate with other components of the system 100. In some implementations, the mapping application 116 receives a request for a map from the navigation application 112. In some implementations, the mapping application 116 fetches map data describing a map from the map data 134 and sends the map data to the navigation application 112. In some other implementations, the mapping application 116 generates additional or different information relating to navigation. For example, the information relating to navigation may include, but are not limited to, real-time traffic updates, construction updates, etc.

The traffic module 118 may include software and routines for aggregating real-time, historical, or predicted traffic data and, in some instances, serving requests for the traffic data. In some instances, the traffic module 118 may also determine which areas to monitor, as described above. For instance, the traffic module 118 may collect data from mobile computing systems 108, client devices 110, traffic cameras, traffic sensors, or other real-time data gathering devices and may, for instance, in response to a request by a navigation application 112, provide the real-time data to the navigation application 112. It should be noted that real-time data may include certain delays due to latency, processing, transfer time, etc. The traffic module 118 may use historical traffic data and, in some instances, real-time traffic data to estimate what a future traffic level may be. In some instances, alone, or in combination with the navigation application 112, as described elsewhere herein, the traffic module 118 may estimate an impact of balancing traffic levels (e.g., by delaying departure times) on predicted traffic levels. The features and operations of the traffic module 118 may be combined or redistributed with the navigation application 112 without departing from the scope of this disclosure.

In some implementations, the map data 134 may include map data, such as the locations (e.g., GPS), interconnections, shapes, etc., of roads. The map data 134 may include identifications of roadway segments, roadway junctions, lanes, traffic signal locations, high-demand areas, defined monitored area attributes, etc.

In some implementations, the roadway traffic data 136 may include traffic data that may be time dependent, and/or averaged over time, travelers, or vehicles. The roadway traffic data 136 may be gathered by aggregating data from mobile computing systems 108, client devices 110, traffic cameras, or other traffic monitoring devices. The roadway traffic data 136 may also aggregate and serve real-time traffic data, traffic prediction data, areas and/or times with high ride demand or congestion, etc.

Figure 2:
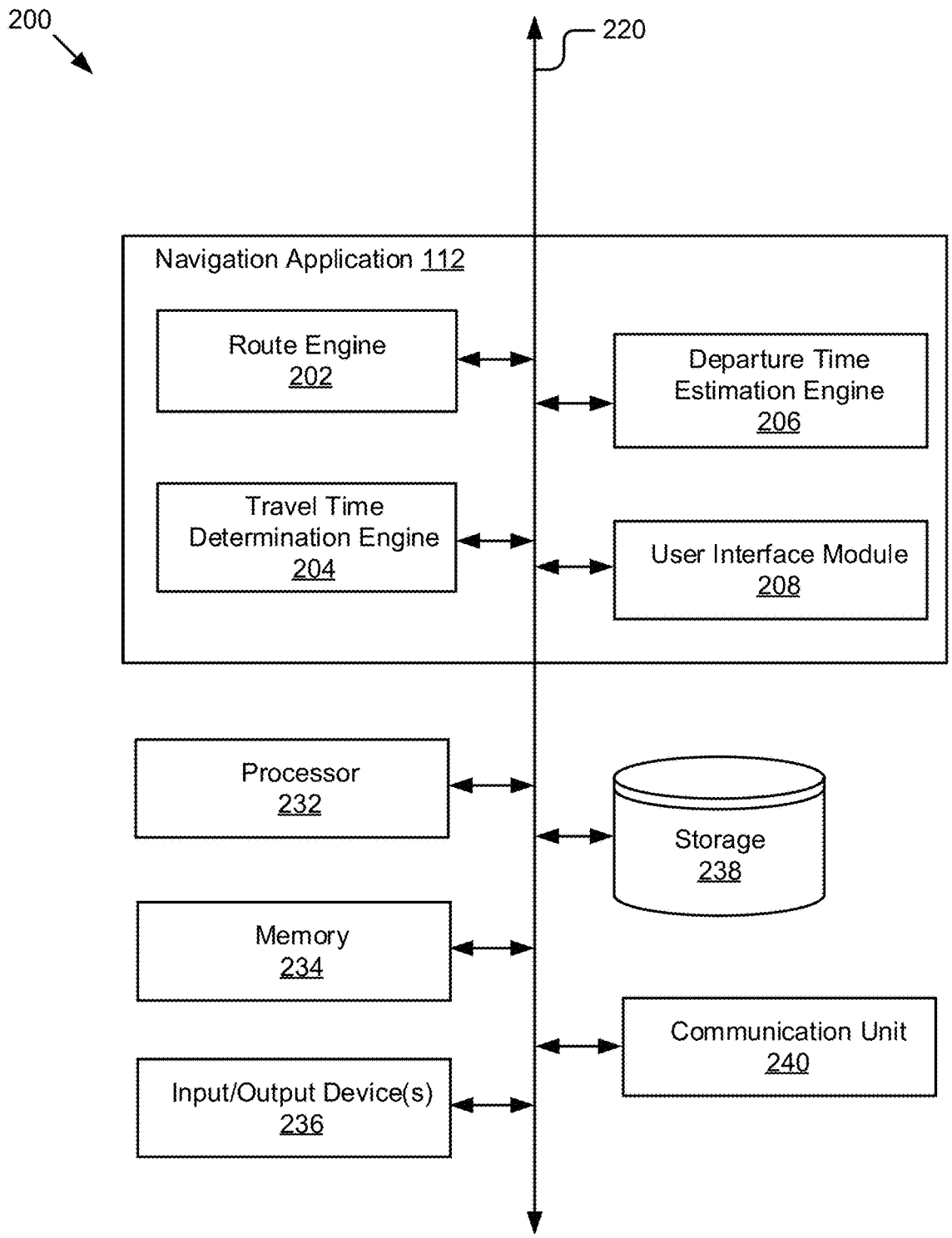
FIG. 2 is a block diagram illustrating an example computing device that includes a navigation application.

Referring now to FIG. 2, an example of the navigation application 112 is shown in more detail. FIG. 2 is a block diagram of a computing device 200 that includes a navigation application 112, a processor 232, a memory 234, input/output device(s) 236, a storage device 238, and a communication unit 240 according to some implementations. The components of the computing device 200 are communicatively coupled by a bus 220. The computing device 200 may represent a navigation server 104, client device 110, or mobile computing system 108 depending on the implementation.

The processor 232 may include an arithmetic logic unit, a microprocessor, a general-purpose controller, or some other processor array to perform computations and, in some instances, provide electronic display signals to a display device. The processor 232 is coupled to the bus 220 for communication with the other components. Processor 232 processes data signals and may include various computing architectures including a complex instruction set computer (CISC) architecture, a reduced instruction set computer (RISC) architecture, or an architecture implementing a combination of instruction sets. Although FIG. 2 illustrates a single processor 232, multiple processors 232 may be included. Other processors, operating systems, sensors, displays, and physical configurations are possible.

The memory 234 may store instructions and/or data that can be executed by the processor 232. The memory 234 may be coupled to the bus 220 for communication with the other components. The instructions and/or data may include code for performing the techniques described herein. The memory 234 may be a dynamic random access memory (DRAM) device, a static random access memory (SRAM) device, flash memory or some other memory device. In some implementations, the memory 234 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 240 transmits and receives data to and from the navigation application 112. The communication unit 240 may be coupled to the bus 220. In some implementations, the communication unit 240 includes a wireless transceiver for exchanging data with the other components in the computing device 200 or other communication channels using one or more wireless communication methods, including IEEE 802.11, IEEE 802.16, BLUETOOTH® or another suitable wireless communication method.

In some implementations, the communication unit 240 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 240 includes a wired port and a wireless transceiver. The communication unit 240 also provides other conventional connections to the network 102 for distribution of files and/or media objects using standard network protocols including TCP/IP, HTTP, HTTPS and SMTP, etc.

The storage device 238 can be a non-transitory memory that stores data for providing the functionality described herein. The storage device 238 may be a dynamic random access memory (DRAM) device, a static random access memory (SRAM) device, flash memory or some other memory devices. In some implementations, the storage device 238 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated implementation, the storage device 238 is communicatively coupled to the bus 220. In one implementation, the storage device 238 includes route data, map data, or other data described, for example, in reference to the system 100. For example, the storage device 238 may store other data for providing the functionality described herein.

The input/output device(s) 236 are hardware for receiving input and/or providing output. For example, the input/output device(s) 236 may include displays for receiving or outputting graphical images, speakers to produce sound (e.g., audio instructions corresponding to the route), microphones to record sound (e.g., feedback from the user) and other sensors or feedback devices like accelerometers. Optionally, the input/output device(s) 236 may include one or more analog-to-digital or digital-to-analog converters, and/or one or more digital signal processors to facilitate audio processing. These input/output device(s) 236 are coupled to the bus 220 for communication with the processor 232 and the memory 234. Optionally, a microcontroller may be added as part of the input/output device(s) 236 to facilitate power systems control, as well as off-load the main processor 232 from lower-speed lesser-important tasks.

Although not illustrated, the computing device 200 may include one or more devices for determining its location. For instance, the computing device 200 may include a GPS receiver, Wi-Fi radio, cellular radio, or other device capable of or configured to determine the current location of the computing device 200.

In the illustrated implementation shown in FIG. 2, the navigation application 112 may include a route engine 202, travel time determination engine 204, departure time estimation engine 206, and/or a user interface module 208. In some implementations, the components of the navigation application 112 may be communicatively coupled via the bus 220. In some embodiments, the navigation application 112, the route engine 202, travel time determination engine 204, departure time estimation engine 206, and/or a user interface module 208 may be implemented using software executable by one or more processors of one or more processors and/or computing devices, using hardware, such as but not limited to a field-programmable gate array (FPGA), an application-specific integrated circuit (ASIC), etc., and/or a combination of hardware and software, etc.

The route engine 202 may comprise software and/or hardware logic executable to request map data and route data from the data server 106. In one implementation, the route engine 202 can be a set of instructions executable by the processor 232 to provide the functionality described below for estimating transit times, etc., generating routes, requesting map data and route data from the data server 106, etc.

In some implementations, the route engine 202 generates a request for a map and sends the request for the map to the data server 106. For example, the route engine 202 may generate a request for a map covering a certain area. The map data can include multiple freeways and intersections in the area, historical routes traveled by users, geographic location (e.g., GPS) data describing maps, ride requests in the area, roadway segments and roadway junctions, and other data from the data server 106, for example.

In some implementations, the route engine 202 sends map data, traffic data, etc., describing a route, for example, to one or more of the other components of the navigation application 112. In some implementations, the route engine 202 stores map data, routes, or other data received or processed by the route engine 202 in the storage 238.

The travel time determination engine 204 may comprise software and/or hardware logic executable to calculate travel times and perform other operations, etc., for example as described in further detail below (e.g., in reference to FIG. 6). In some implementations, the travel time determination engine 204 may determine which areas to monitor, as described above.

The departure time estimation engine 206 may comprise software and/or hardware logic executable to consider departure delays and their impacts on traffic and travel time, for example, as described in further detail below (e.g., in reference to FIG. 7).

One or more of the components of the navigation application 112 may select certain areas for which to monitor traffic, as described above, for example, corresponding to or including high-demand areas. In some implementations, the monitored area may be selected based on a threshold distance from the location of one or more ride requests, although it is possible to monitor traffic anywhere in a transportation system without departing from the scope of this disclosure. The threshold may be defined in terms of a radius from a location (e.g., of a mobile computing system 108, client device 110, or user interacting with one of these devices and manually inputting the location) or may be defined as a distance along roadways from the location, for instance. Additionally or alternatively, the navigation application 112 may define the threshold defined dynamically based on additional factors, such as an estimated travel time of a vehicle from its location. For instance, if a route includes high speed travel, such as by freeway, the threshold may be defined as a farther distance from the location.

The user interface module 208 may comprise software and/or hardware logic executable to generate a user interface for displaying information of a route for a user. In one implementation, the user interface module 208 can be a set of instructions executable by the processor 232 to provide the functionality described below for generating a user interface for displaying information of one or more travel itineraries for a user. In another implementation, the user interface module 208 can be stored in the memory 234 of the computing device 200 and can be accessible and executable by the processor 232. In either implementation, the user interface module 208 can be adapted for cooperation and communication with the processor 232 and other components of the computing device 200.

Figure 9:
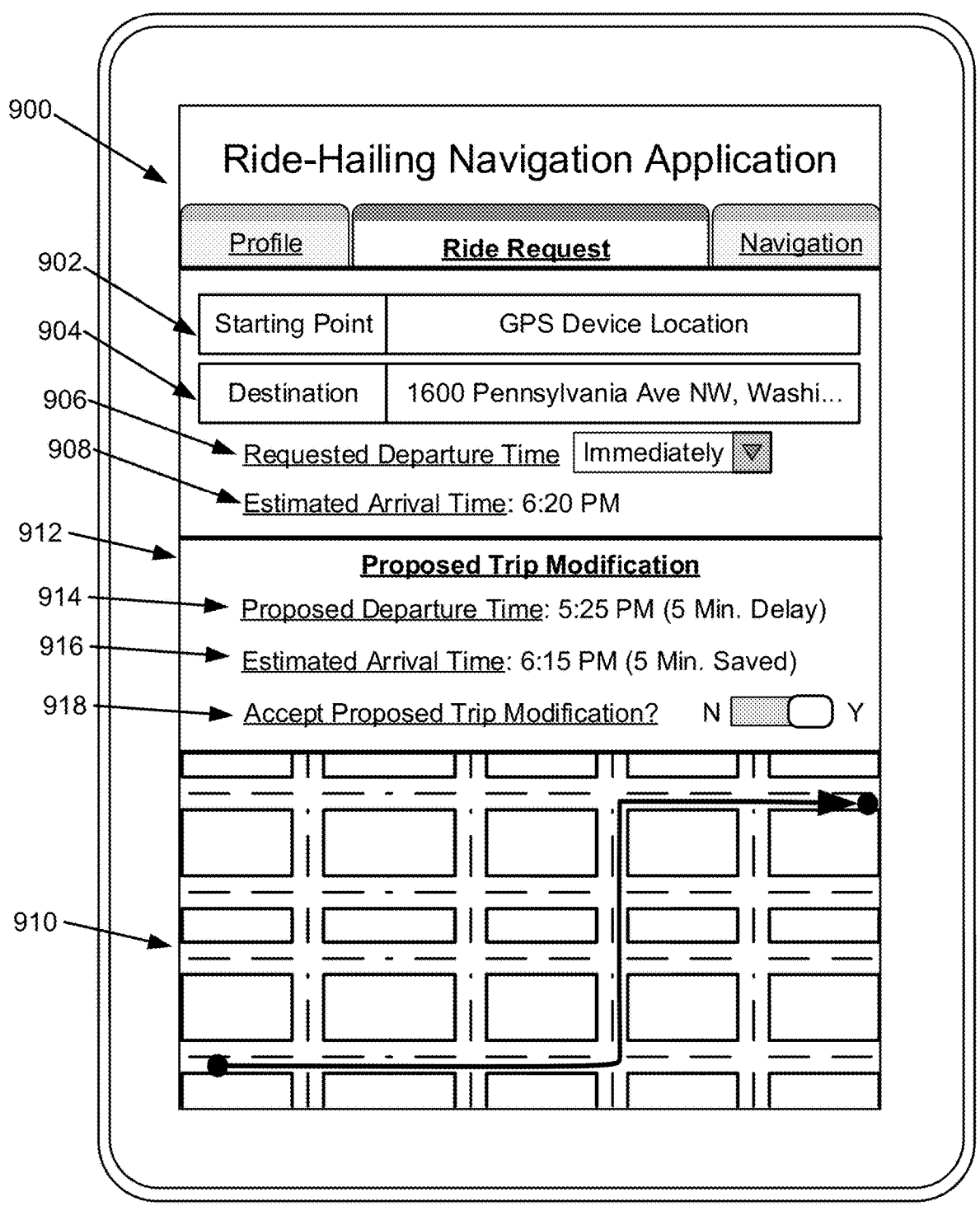
FIG. 9 is an illustration of an example graphical user interface that may be provided by the navigation application.

In some implementations, the user interface module 208 receives instructions from the route engine 202 to generate a user interface (e.g., as illustrated in the example of FIG. 9) for displaying information regarding calculated routes, travel times, departure times, estimated times of arrival, etc. In another example, the information also includes traffic delay information and road closure information associated with the route. In some implementations, the user interface module 208 transmits the user interface data including the useful information to a client device 110 or a mobile computing system 108, causing the client device 110 or the mobile computing system 108 to display the user interface including useful information to the user.

Figure 3A:
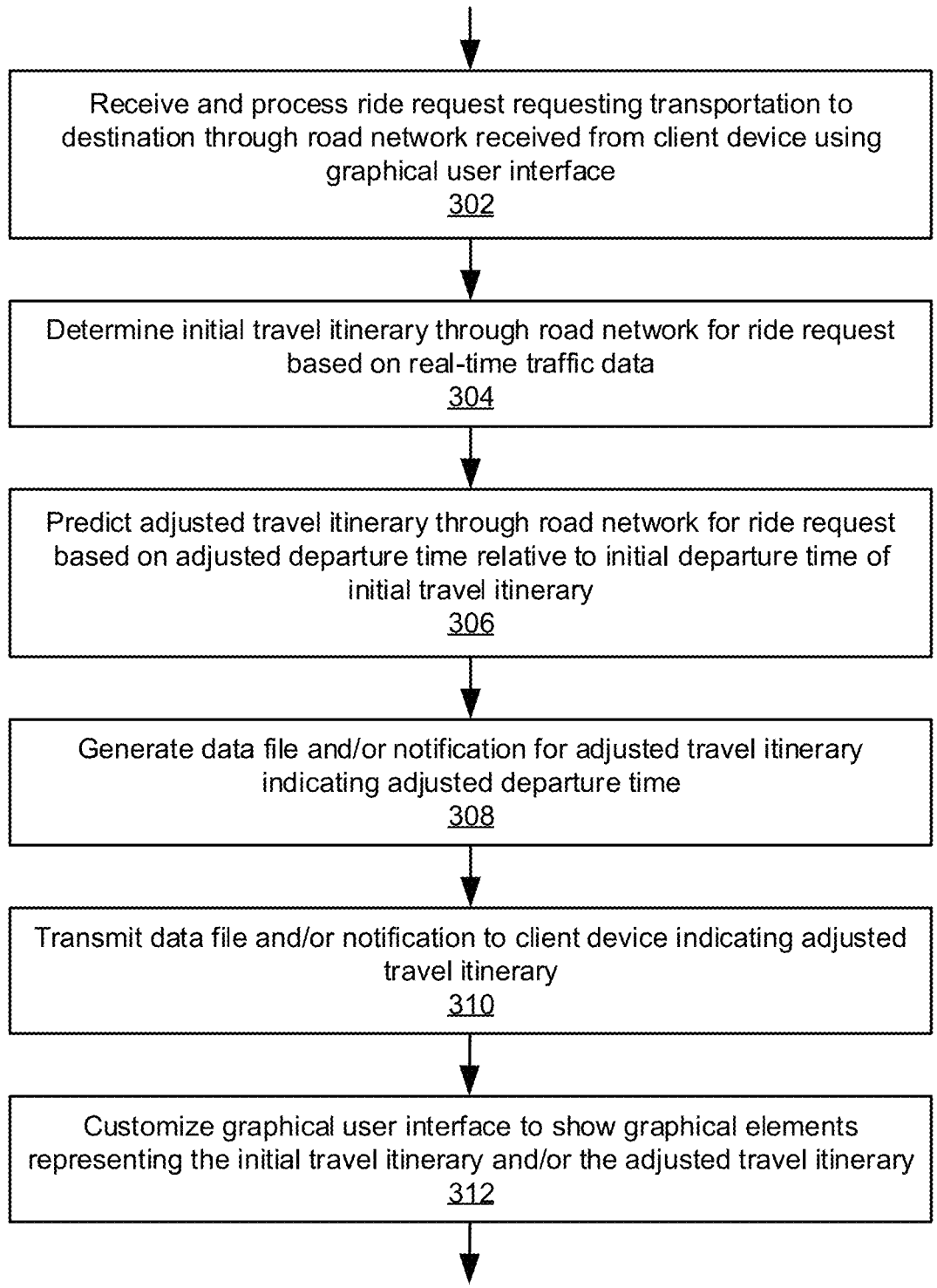
FIG. 3A is a flow diagram of an example method for generating travel itineraries including planning departure times of rides in consideration of congestion mitigation.

FIG. 3A is a flow diagram of an example method for generating travel itineraries including planning departure times of rides in consideration of congestion mitigation.

At 302, the navigation application 112 (e.g., via graphical user interface displayed on a client device 110 or mobile computing system 108) may receive and process one or more ride requests requesting transportation to a destination location(s) through a road network. In some implementations, the navigation application 112 may process the ride request received from a client device, which may request a ride through a road network, for instance, having two or more routes between an origination location to a destination location.

In some implementations, receiving and processing the ride request may include determining a current location of the client device 110 (or mobile computing system 108) using a location service of the client device 110. For instance, the navigation application 112 may receive the location of the client device 110 based on GPS, cellular network triangulation, etc. Similarly, the navigation application 112 may receive the destination location as input from a user, depending on the implementation. The current location of the client device 110 may be used as the origination/departure location for the ride request.

In some implementations, the navigation application 112 may receive (e.g., via the graphical user interface) an input identifying the destination location requested for the ride request. In some implementations, the navigation application 112 may also receive a preferred departure time, which the navigation application 112 may set as the initial departure time described below. In instances where the requested departure time is in the future, the navigation application 112 may compute an adjusted departure time (along with predicted traffic level at the requested departure time) as being prior to or after the requested departure time in order to decrease travel time. Accordingly, while this disclosure describes postponing departure times, similar operations may also be used to advance departure times, for example, when the requested departure time occurs at a high-demand time.

In some implementations, at 304, the navigation application 112 may determine an initial travel itinerary via the road network for the ride request based on real-time traffic data for the road network. In some implementations, the road network may be a certain network or monitored area, as described above.

The initial travel itinerary may include an initial departure time. In some implementations, the navigation application 112 may determine a departure time for the ride request based on a time at which the ride request is received and an offset. For instance, the offset may be based on processing time, the time used for a user to travel to the departure location, or the time used for a vehicle to arrive at the departure location. For example, the navigation application 112 may determine the initial departure time based on the location of a vehicle available for providing rides and the current location of the client device 110. In some implementations, the navigation application 112 may monitor the location of available vehicles within a threshold distance of the from a high-demand area or may receive a message indicating the location of a vehicle available for providing rides based on a location of a mobile computing system 108 associated with the vehicle.

The travel itinerary may include a route computed between the departure location and the destination location and, in some instances, traffic and travel times along the route. In some implementations, the travel itinerary may also include a current or future location of the vehicle providing the ride (e.g., as described below in reference to the example in FIG. 4A). In some instances, the navigation application 112 may compute multiple routes to the destination location and use the traffic along the various routes in the computation of the travel itinerary and its associated travel and arrival time.

Depending on the implementation, the travel itinerary may include a travel time of a vehicle to the departure location, a loading time, a departure time, one or more transit times through the transportation system to the destination, an arrival time, an unloading time, turn-by-turn directions, etc. The calculation of travel times and directions may be based on roadway segment and junction travel times, which may be based on road geometry and real-time, historical, and/or predicted traffic for one or more routes to the destination. Example operations for determining the initial travel itinerary through the road network for the ride request are described in reference to FIG. 6.

At 306, the navigation application 112 may compute a predicted, adjusted travel itinerary via a road network for the ride request based on a postponed or otherwise adjusted departure time relative to the initial departure time of the initial travel itinerary. The navigation application 112 may compute the adjusted travel itinerary based on projected traffic data for the road network. Among other aspects, the navigation application 112 may compute or retrieve (e.g., from the mapping application 116) one or more optimal routes between a first location (e.g., a departure location or current location of a vehicle) and a destination location.

The adjusted travel itinerary may include the some or all of the same aspects as the initial travel itinerary described above but adjusted for changed departure time, predicted traffic, route, arrival time, etc. For instance, the adjusted travel itinerary may include a postponed departure time.

In some implementations, the navigation application 112 may compute the adjusted travel itinerary by adjusting a projected traffic level of the route. For example, the navigation application 112 may estimate a predicted traffic level along the route to the destination in the future (based on the delayed departure) and use the predicted traffic to determine a travel time and arrival time for the delayed departure. In some instances, the navigation application 112 may recalculate the route at the future point in case there is a more efficient route later.

In some implementations, the navigation application 112 may compute or adjust the predicted traffic level based on the decreased current traffic level (and potentially increased future traffic level) caused by the adjusted departure of the ride. For instance, as described in reference to FIG. 7, the delayed departure may balance the congestion in the high-demand area over time thereby increasing the efficiency of the roadway network and decreasing the average travel time of vehicles. The navigation application 112 may determine the effect of the adjusted departure time of the ride, or potentially a group of rides, on the projected traffic level on the road network and/or routes to the destination. For example, the navigation application 112 may offer delayed departure times for a group of rides and use the acceptance rate of the delayed departure times to influence the roadway congestion in the high-demand area and, based on the influence, further improve the accuracy of the traffic prediction, travel time, and arrival time of the ride(s). For instance, the navigation application 112 may use a historical rate at which users (e.g., as a group, based on individual user behavior, or based on a trained computer-learning model) take delayed departures to determine the acceptance rate to better model the impact of the delays on congestion and travel times.

In some implementations, when determining a predicted traffic level, the navigation application 112 may use the rate of adjusted departure times verses the rate of overall traffic (e.g., as described in reference to FIGS. 5A and 8) in consideration of the effect of the delayed departure time on the predicted traffic level. For example, as described in reference to FIG. 4A, the navigation application 112 may assume that the rate of other traffic on the roadway network is not changed by the delayed departure time(s), while the rate of the requested ride(s) may be changed by the delayed departure time(s).

In some implementations, the navigation application 112 may compute an optimal departure time, for example, by calculating a set of delayed departure times and/or routes and then determining which is the soonest and/or has the lowest travel time. Example operations for determining computing an adjusted travel itinerary are described in reference to FIG. 7.

In some implementations, at 308, the navigation application 112 may generate a data file and/or a notification for the adjusted travel itinerary, which indicates the postponed departure time, other aspects of the adjusted travel itinerary, and/or the initial travel itinerary. For instance, the data file may be transmitted in a notification to a client device 110 and/or mobile computing system 108 associated with a vehicle (e.g., a vehicle of a ride-hailing service).

At 310, the navigation application 112 may transmit the data file and/or notification to a client device 110 or mobile computing system 108 indicating the adjusted travel itinerary. The transmission may be performed using the communication unit and network 102, as described above. In some instances, where the navigation application 112 is executed on the client device 110 or mobile computing system 108, the navigation application 112 may transmit the notification to a user interface module 208, which may render it for display to the user, for example, as described in reference to 312 below.

In some implementations, the navigation application 112 may transmit the data file to a mobile computing system 108 associated with a vehicle designated to service the ride request. For example, as mentioned above, the navigation application 112 may determine a vehicle available for providing rides at the departure location based on a location of one or more available vehicles, the departure location, and/or the adjusted departure time associated with the ride request. The navigation application 112 may transmit the notification or data file indicating the adjusted travel itinerary to a computing device associated with the vehicle that is available for providing rides for ride requests.

In some implementations, the navigation application 112 may determine route guidance data for the route of one or both of the initial travel itinerary and adjusted travel itinerary. For instance, the navigation application 112 may determine route guidance for a particular route including a location of the vehicle available for providing rides, the departure location associated with the ride request, and the destination location.

In some implementations, at 312, the navigation application 112 may customize, for display on the client device 110 or mobile computing system 108, a graphical user interface to show graphical elements representing the initial travel itinerary and/or the adjusted travel itinerary. The navigation application 112 may customize the graphical user interface in response to an estimation, based on the real-time traffic data and the projected traffic level, that the effect of the postponed departure time will be that a future traffic level in the road network will be lower than a current traffic level. For instance, the customization may be performed based on the effect of the postponed departure time on a projected traffic level in the road network, as described in reference to FIG. 7 and FIG. 9.

Figure 3B:
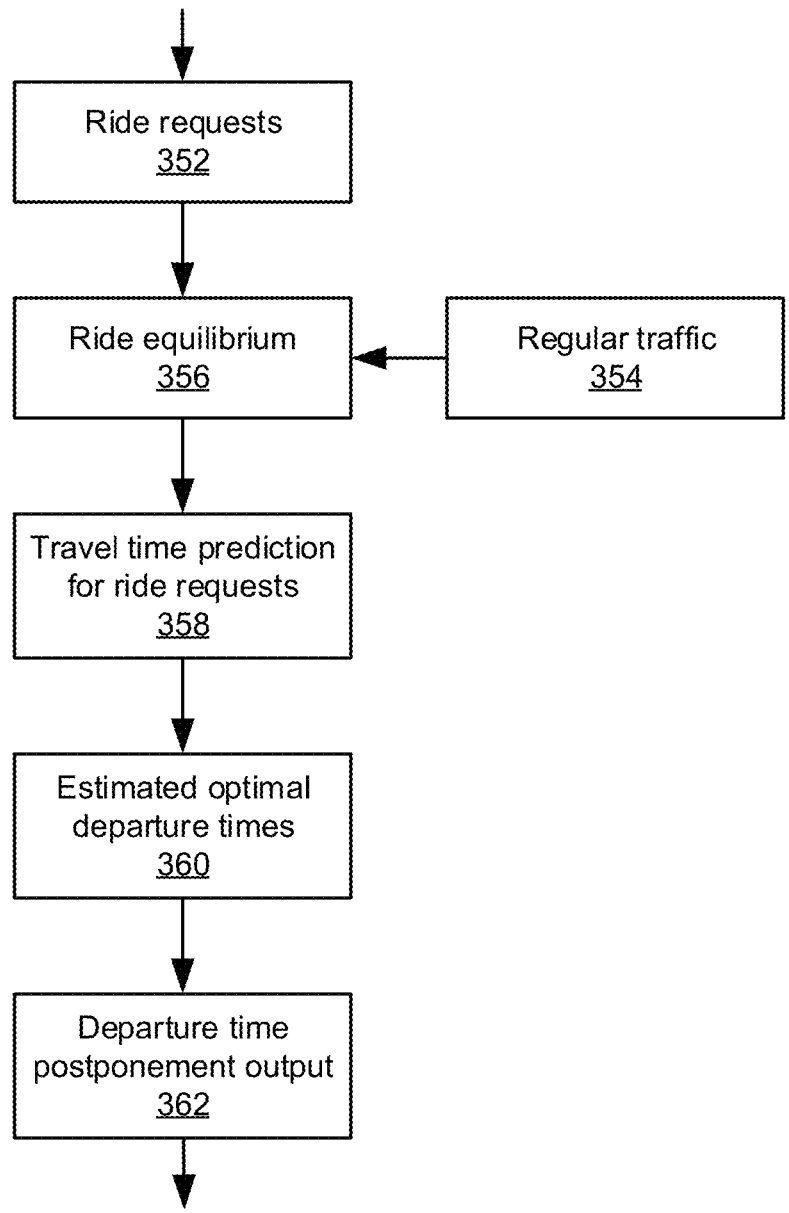
FIG. 3B is an example data flow diagram for generating travel itineraries including planning departure times of rides in consideration of congestion mitigation.

FIG. 3B is an example data flow diagram for generating travel itineraries including planning departure times of rides in consideration of congestion mitigation. The navigation application 112 may use the example data flow of FIG. 3B to predict travel time with shared-ride requests and estimate optimal departure times. Using this system, riders may be asked to wait for short periods for a shared or hailed ride in exchange for a shorter travel time and potentially an earlier arrival at their destination.

As illustrated, the navigation application 112 may receive ride requests 352 and data describing regular traffic 354 (e.g., traffic from vehicles other than those associated with ride requests), based on which the navigation application 112 may determine a ride equilibrium. For instance, as described in further detail below, the quantity of rides and vehicles may be determined to be static, but the rate at which they pass through a roadway network may vary over time.

Figure 4A:
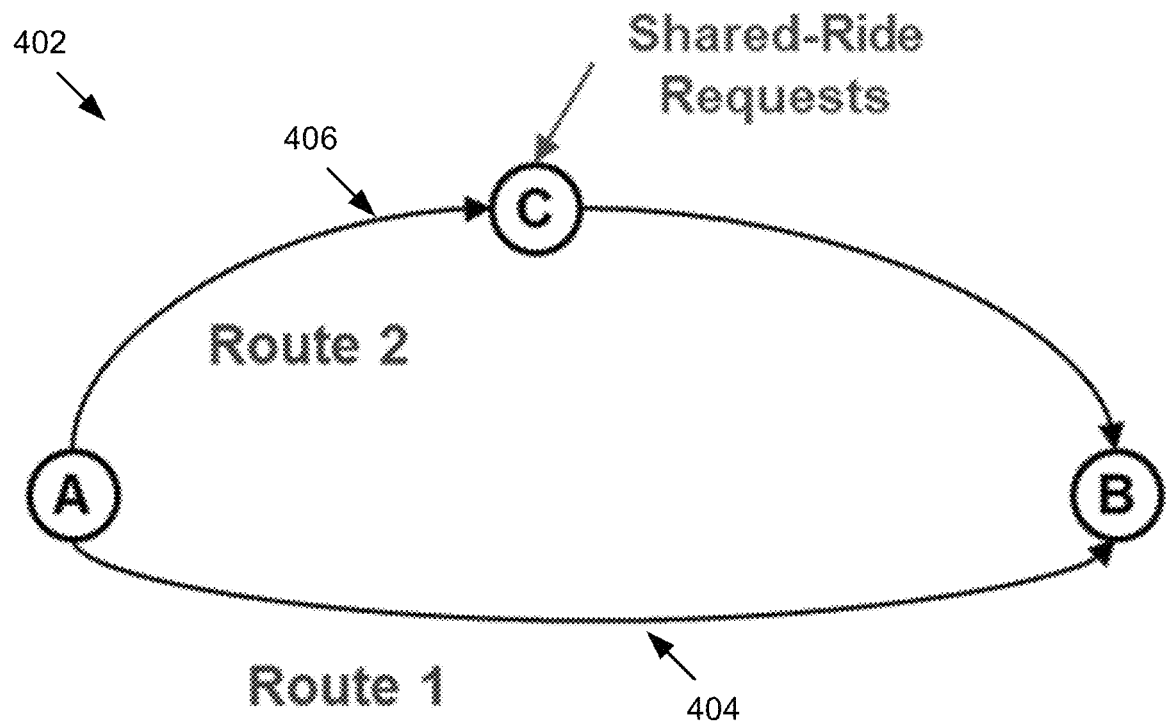
FIG. 4A illustrates an example roadway network with multiple routes.
Figure 6:
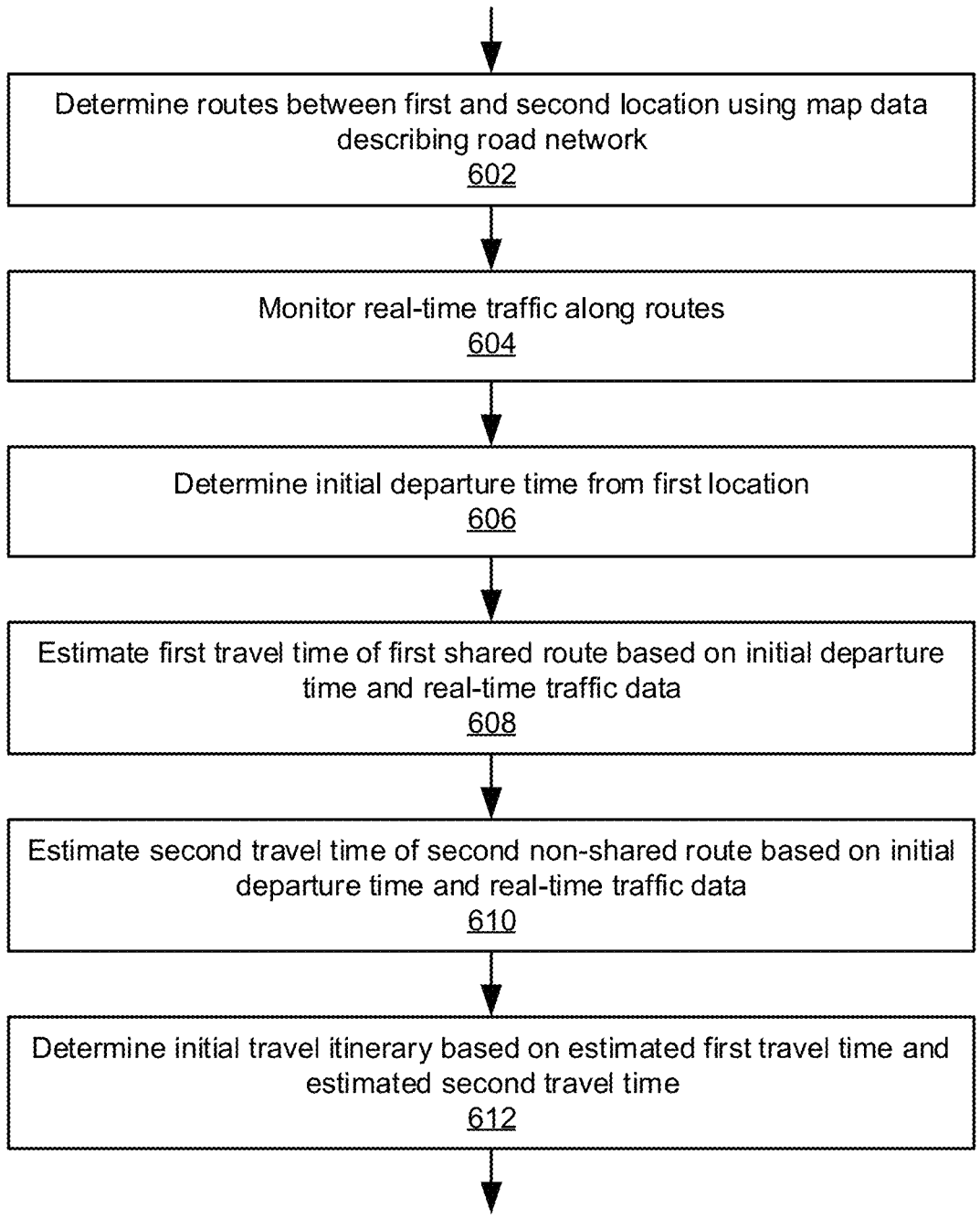
FIG. 6 is a flow diagram of an example method for determining an initial travel itinerary via the road network for the ride request based on real-time traffic data for the road network.

As described in reference to FIG. 3A and FIG. 6, the navigation application 112 may determine a travel time (e.g., duration) prediction for ride requests 358. The travel time of the vehicles in a network may be predicted based on the requests from the passengers and the demand of regular trips. For instance, FIG. 4A shows a sample network 402 with two routes from node A to B. Route 1 shown at 404 from node A to node B may be a regular route without a shared or ride-hailed stop (or without a shared or ride-hailed stop associated with the navigation application), but which may still affect traffic in the roadway network. On route 2 shown at 406, there is one stop C illustrated for passengers to request rides and to wait for pick up for rides via route 2 to node B, which may be a destination or an exit to the network. For instance, node C may be an airport waiting zone for ride-hailing services (e.g., a Lyft® or Uber® waiting zone), node A may be an entrance to an airport roadway network, and node B may be an exit from the airport roadway network.

Figure 4B:
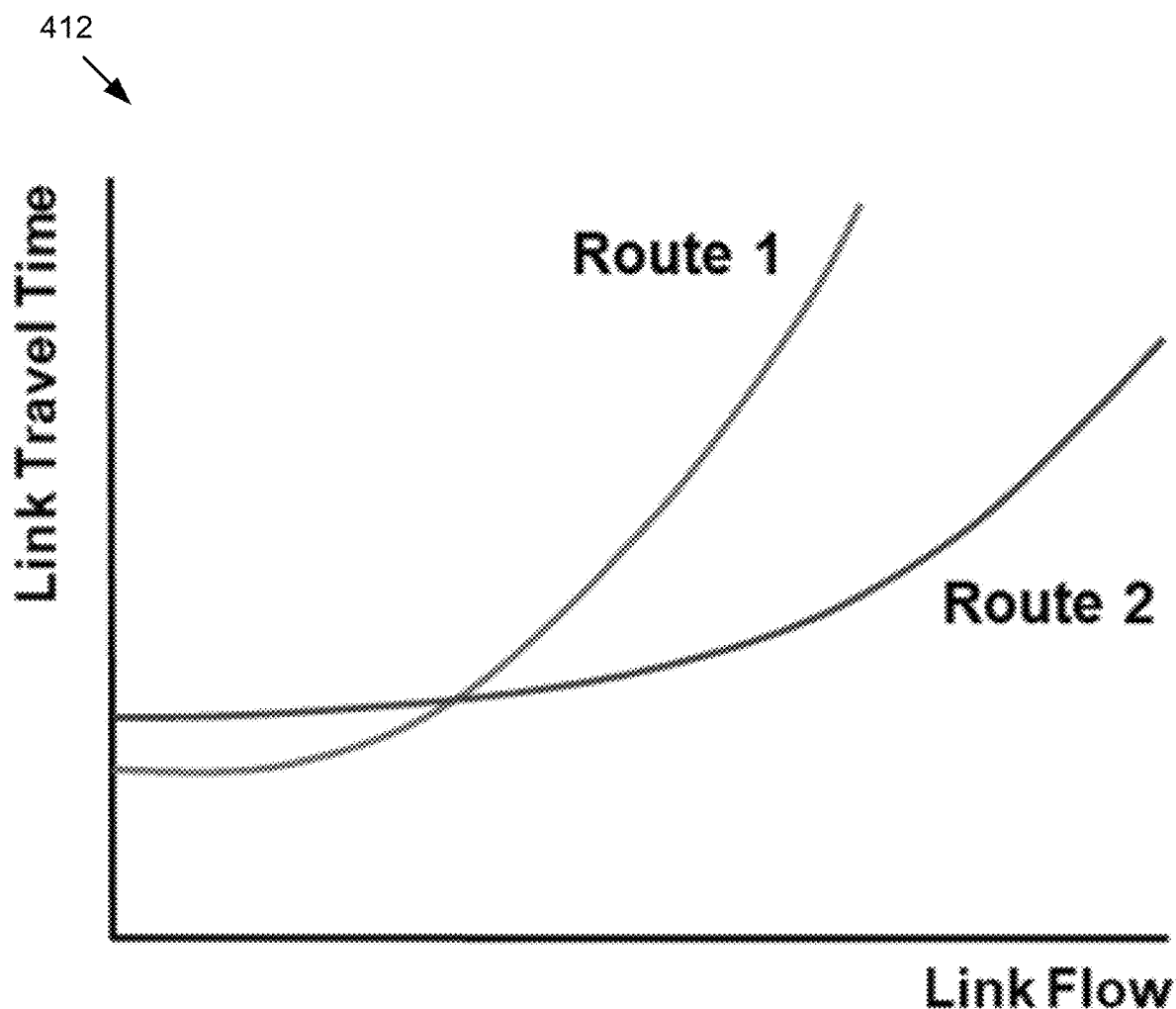
FIG. 4B illustrates an example link cost function for a given roadway network with multiple routes.

The travel time may be estimated using a link cost function with respect to link flow rate, for example, as illustrated in the chart 412 FIG. 4B, which illustrates a link cost function for a given network. For example, assuming that the demand of regular trips from A to B is $q_r(t)$ and the rate of shared-ride requests is $q_s(t)$ at time t, $t \in (0, T]$ where T is the total time period of consideration. The travel time on the two routes may be either the same due to user equilibrium, or it may be different if the demand of regular traffic has solely shared rides. The flows on the two routes can be estimated as $q_1(t)$ for the first/regular route and $q_2(t)$ for the second/shared route. In this example, $q_1(t)+q_2(t)=q_r(t)+q_s(t)$ (e.g., that total vehicles passing through the system does not change) and $q_s(t) \leq q_2(t)$ (e.g., that the flow on route 2 is less than or equal to the shared requests received). If $q_s(t)<q_2(t)$, (e.g., the quantity of ride requests is less than actual rides) then $TT_1(q_1(t))=TT_2(q_2(t))$. Similarly, If $q_s(t)=q_2(t)$ (e.g., the quantity of ride requests is equal to actual rides), then $TT_1(q_1(t))<TT_2(q_2(t))$. In this annotation, $TT_1(q_1(t))$ and $TT_2(q_2(t))$ are link cost functions of the first and second route respectively, for example represented in FIG. 4B. The navigation application 112 does not affect the demand/congestion due to regular trips, but it may modify shared-ride requests to improve roadway network performance, as described above.

Figure 5:
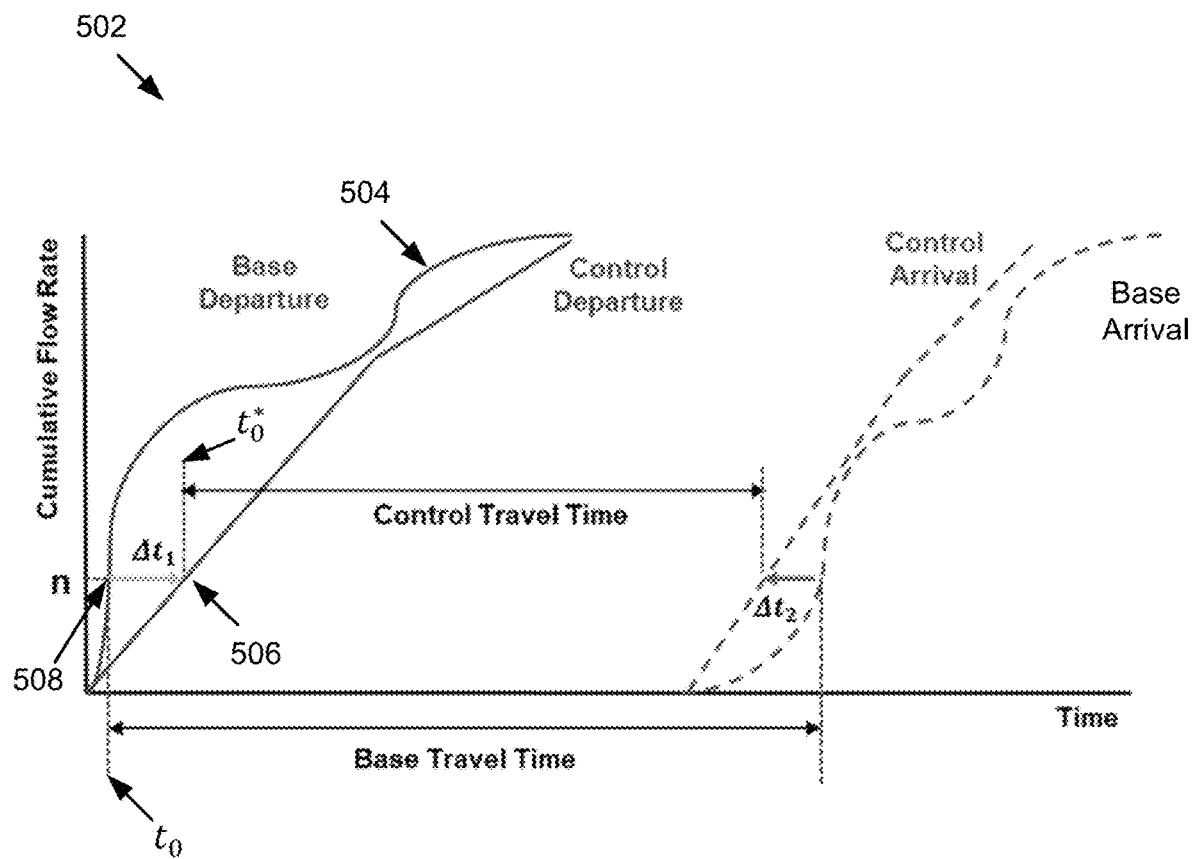
FIG. 5 illustrates a chart showing example cumulative departure and arrival rates of vehicles before and after introducing the revised ride requests.
Figure 7:
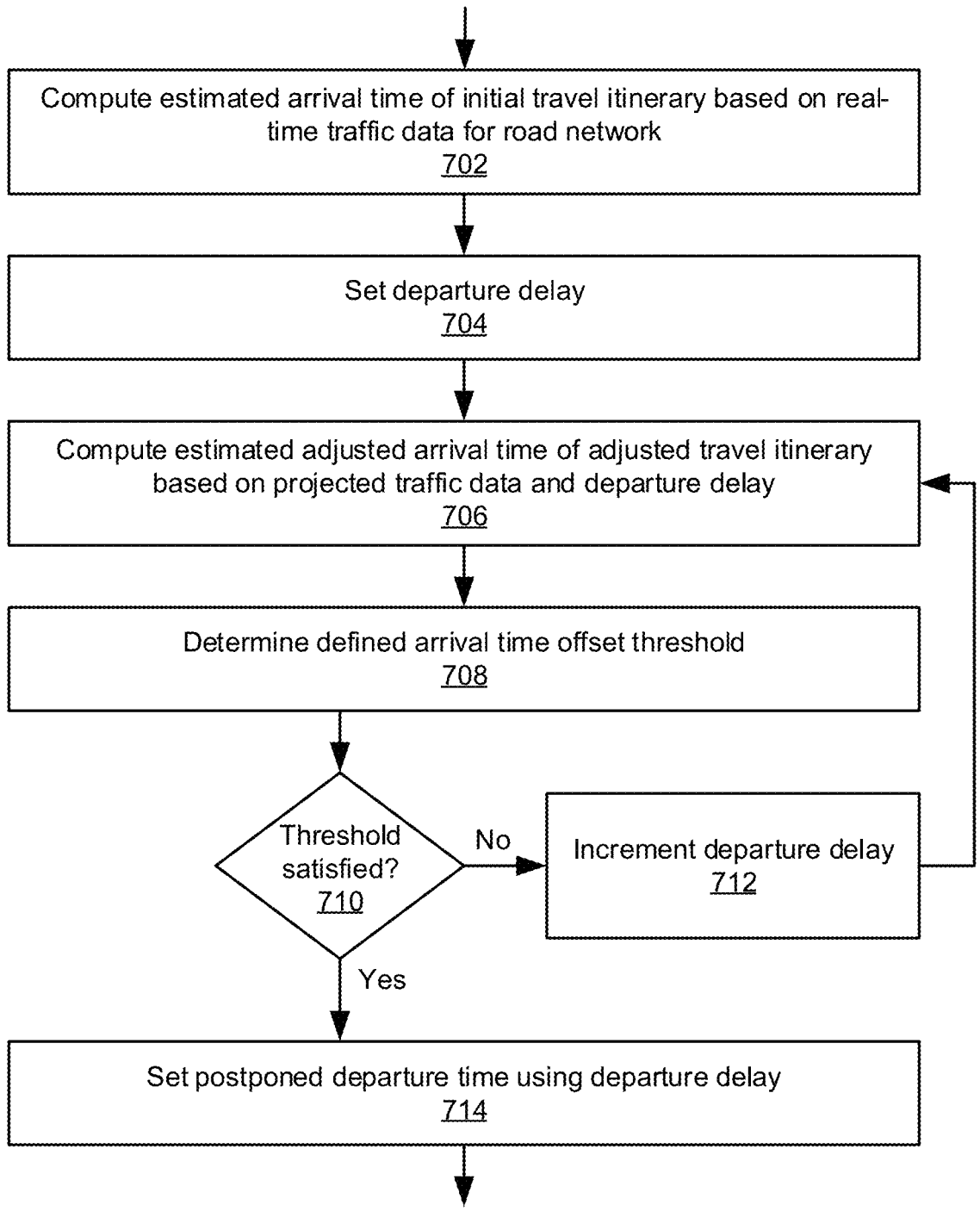
FIG. 7 is a flow diagram of an example method for computing a predicted, adjusted travel itinerary via a road network for the ride request.

Returning to FIG. 3B, the navigation application 112 may determine estimated optimal departure times 360, for example, as described in reference to FIG. 3A and FIG. 7. For instance, the navigation application 112 may search for a revised rate for the shared rides, $q^*_s(t)$, where the total quantity of the shared rides is the same, i.e. that $\int_0^T q_s(\tau) d\tau = \int_0^T q^*_s(\tau) d\tau$. This may be subject to the constraint that the departure time of each shared ride shall not be earlier than the original value, i.e., $\int_0^t q_s(\tau) d\tau = \int_0^t q^*_s(\tau) d\tau$, where $\tau \in (0, T]$, For example, FIG. 5 illustrates a chart 502 showing the cumulative departure and arrival rates of vehicles before and after introducing the revised shared-ride requests. The slope of each line represents the traffic flow rate, q(t). Generally, with a higher flow rate, the link travel time is larger (as shown in FIG. 4B). For example, for the ride n illustrated in the base departure line 504, its departure time is $t_0$, where travel time may be represented based on $n = \int_0^{t_0} q_s(\tau) d\tau$. As the flow rate (e.g., the congestion amount), $q_s(t_0)$, is illustrated as being very high, the base travel time of the ride to the node B may be very large. However, with the revised flow, the vehicle will depart at $t^*_0$, where $n = \int_0^{t^*_0} q_s(\tau) d\tau$. The departure time is postponed for a short duration, $\Delta_{t_1} = t^*_0 - t_0$. As the flow rate, $q^*_s(t^*_0)$ shown at 506, is much smaller than $q_s(t_0)$ shown at 508, the controlled link travel time is smaller than the base value, i.e., $TT_2(q^*_s(t^*_0)) < TT_2(q_s(t_0))$. The total value of the delayed duration and the control travel time may still be smaller than the base travel time. Hence, the ride can arrive at a certain time, $\Delta t_2$, earlier.

Returning to FIG. 3B, the navigation application 112 may send a departure time postponement output 362. For instance, the navigation application 112 may transmit a notification to a client device 110 or mobile computing system 108, or may otherwise customize a graphical user interface indicating the adjusted departure time.

FIG. 6 is a flow diagram of an example method for determining an initial travel itinerary via the road network for the ride request based on real-time traffic data for the road network. For instance, the navigation application 112 or another component of the system 100 may predict the travel time of vehicles in a roadway network using requests from passengers and roadway congestion due to regular traffic.

At 602, the navigation application 112 may determine routes between a first and second location using map data describing a road network. In some instances, the navigation application 112 may determine multiple, alternate routes or routes including stops (e.g., as illustrated in FIG. 4A) between these locations.

In some implementations, the navigation application 112 may determine a set of routes between the location of the client device 110 and the destination location using one or more of map data, roadway travel times, roadway congestion, or ride requests, etc. For instance, the navigation application 112 may select among roadway segments and roadway junctions to connect the location of the client device 110 and the destination location and may, for example, select a route(s) with the shortest distances and or shortest total travel times.

In some implementations, the navigation application 112 may further take user preferences (e.g., for avoiding highways, toll roads, etc.) into consideration in its determination of routes, as described above. In some implementations, the navigation application 112 may generate one or a set of routes tracing roads from an origin location to a destination location and may use the segment and roadway junction travel times to select the most effective route.

At 604, the navigation application 112 may monitor real-time traffic along the routes, and/or in a certain selected region, as described above. For example, the navigation application 112 may receive traffic information of a given roadway section including a historical traffic level, a current traffic level, or other data. In some implementations, the navigation application 112 may calculate a roadway segment travel time for roadway segments of the plurality of roadway segments. For instance, the roadway segment travel times may be determined based on real-time traffic data, historical travel times on the particular roadway segment, or other data, for instance received from the traffic module 118, roadway traffic data, or other components of the system 100. In some instances, such as when the initial departure time is in the future, the navigation application 112 may also predict a future traffic level along the route, for example, based on a current, real-time traffic level and/or a historical traffic level, etc.

At 606, the navigation application 112 may determine an initial departure time from the first location. For example, as described in further detail above, the navigation application 112 may determine a departure time based on a ride request, a current location of an available vehicle, or other delays or buffers.

In some implementations, at 608, the navigation application 112 may estimate a first travel time of a first shared route based on the initial departure time and the monitored traffic data. The navigation application 112 may calculate the total travel time of each of the one or more calculated routes based on, for instance, the roadway segment travel times, roadway junction travel times, etc. For example, calculating the total travel time may include determining each of the roadway segments and roadway junctions in a given route and adding the travel time for each of the roadway segments and roadway junctions together.

At 610, the navigation application 112 may estimate a second travel time of second, non-shared route based on initial departure time and real-time traffic data. For instance, as described in reference to FIG. 4A and FIG. 4B, the navigation application 112 may determine a total traffic level including rides that may be influenced (e.g., requested rides or shared rides), and rides which it cannot directly influence (e.g., regular traffic). For instance, the second travel time may correspond to route 1 described in FIG. 4A, while the first travel time may correspond to route 2 described in FIG. 4A. For example, the navigation application 112 may adjust a predicted traffic level based on a delayed departure of a shared ride but may us an unadjusted predicted traffic level of regular/non-shared traffic. In some instances, the navigation application 112 may estimate the first and/or second travel times using a link cost function with respect to link flow rate, for example, as described in reference to FIG. 4B.

At 612, the navigation application 112 may determine an initial travel itinerary based on the estimated first travel time and/or the estimated second travel time. For example, the initial travel itinerary and associated travel time, traffic, etc., may be based on the total traffic and therefore first and second travel times of the respective ride and regular routes.

In some implementations, the navigation application 112 may select a particular route from the set of routes based on a total travel time and a stored user preference for certain route features. For instance, the navigation application 112 may automatically select a particular route or rank the set of routes based on the total travel time and/or a user preference. For instance, the navigation application 112 may determine the preferences of an available vehicle (or its driver, the ride requester, etc.) for the route, for example, to avoid toll roads or freeways and use that information to determine the route and therefore the travel time.

FIG. 7 is a flow diagram of an example method for computing a predicted, adjusted travel itinerary via a road network for the ride request based on an adjusted departure time relative to the initial departure time of the initial travel itinerary. For instance, the operations described in FIG. 6 may determine an appropriate departure delay to decrease roadway congestion, take advantage of the lower roadway congestion, and minimize wait time.

In some implementations, at 702, the navigation application 112 may compute an estimated arrival time of the initial travel itinerary based on the real-time traffic data for the road network. For example, the navigation application 112 may add the initial travel time to the initial departure time of the initial travel itinerary (e.g., as described in reference to FIG. 6) to determine the estimated arrival time.

At 704, the navigation application 112 may set a departure delay. The departure delay may be incremented by any defined amount, depending on the processing requirements and responsiveness of the particular roadway network and/or route to departure delay. For instance, the navigation application 112 may set the departure delay to one-minute increments, although any other increment may be used to balance precision with computing cycles used. In some implementations, the navigation application 112 may train a computer learning model (e.g., using supervised learning, etc.) to define the departure delay computation increment based on a threshold travel time change amount resulting from a defined departure delay/delay increment in general, for a particular high-demand area or roadway network, for a particular roadway section, for a particular route, etc.

At 706, the navigation application 112 may compute an estimated adjusted arrival time of the adjusted travel itinerary based on projected traffic data and the departure delay. For instance, the navigation application 112 may estimate a travel time from the delayed departure to the destination via the calculated route using predicted traffic.

In some implementations, the predicted traffic is based on historical (e.g., based on the same time, event, or level of traffic) traffic at the high-demand area. In some instances, the predicted traffic is also based on real-time traffic data. For example, the navigation application may predict the traffic by reducing real-time traffic data due to the delayed departure time of the ride request(s). The navigation application 112 may determine the percentage of traffic that is due to ride-hailed congestion (e.g., shared or ride-hailed rides) and reduce the traffic by that percentage and/or the percentage of rides that accept or are projected to accept delayed departures.

At 708, the navigation application 112 may determine a defined arrival time offset threshold, which may determine the amount of time that the adjusted travel time and/or arrival time may vary from the initial travel and/or arrival time. In some instances, the threshold may dictate that the travel time must be shorter (or longer within a range) than the travel time of the initial itinerary by a number of minutes, by a percentage, or by another value. In some instances, the threshold may dictate that that the arrival time of the adjusted travel itinerary must be sooner, sooner by a defined amount/percent, or later by a defined amount/percent, etc., than the initial travel itinerary.

At 710, the navigation application 112 may determine whether the defined arrival time offset threshold has been satisfied. For instance, the navigation application 112 may determine that the estimated adjusted arrival time satisfies the defined arrival time offset threshold relative to the arrival time of the initial travel itinerary (e.g., that the adjusted arrival time is sooner than the initial arrival time despite a postponed departure).

At 712, if the threshold is not satisfied, the navigation application 112 may increment the departure delay to be longer and return to the computation at 706 using the incrementally longer delay. Although not illustrated in FIG. 7, the loop may have an exit condition where the adjusted departure time/departure delay is greater than a defined limit and the ride request is determined to not be eligible for a delayed departure. In some instances, the navigation application 112 may nevertheless recommend a delayed departure and may provide another incentive (e.g., a monetary incentive).

At 714, the navigation application 112 may set a postponed departure time using the departure delay. In some implementations, the navigation application 112 may set the adjusted/postponed departure to be the same as the departure delay having the shortest delay that satisfies the defined arrival time offset threshold.

In some implementations, the navigation application 112 may store the departure delay that satisfies the defined arrival time offset threshold and increment (e.g., via operation 712) the departure delay to calculate one or more next estimated adjusted arrival times or travel times for the incremented departure delay. The navigation application 112 may recursively perform this operation until an exit condition (e.g., as described above) is satisfied. Once the group of departure delays are computed, the navigation application 112 may select the most optimal (e.g., based on a shortest travel time, soonest arrival time, most balanced traffic level, etc.) departure delay among the group and set it as the adjusted departure time/delay for the adjusted travel itinerary.

Figure 8:
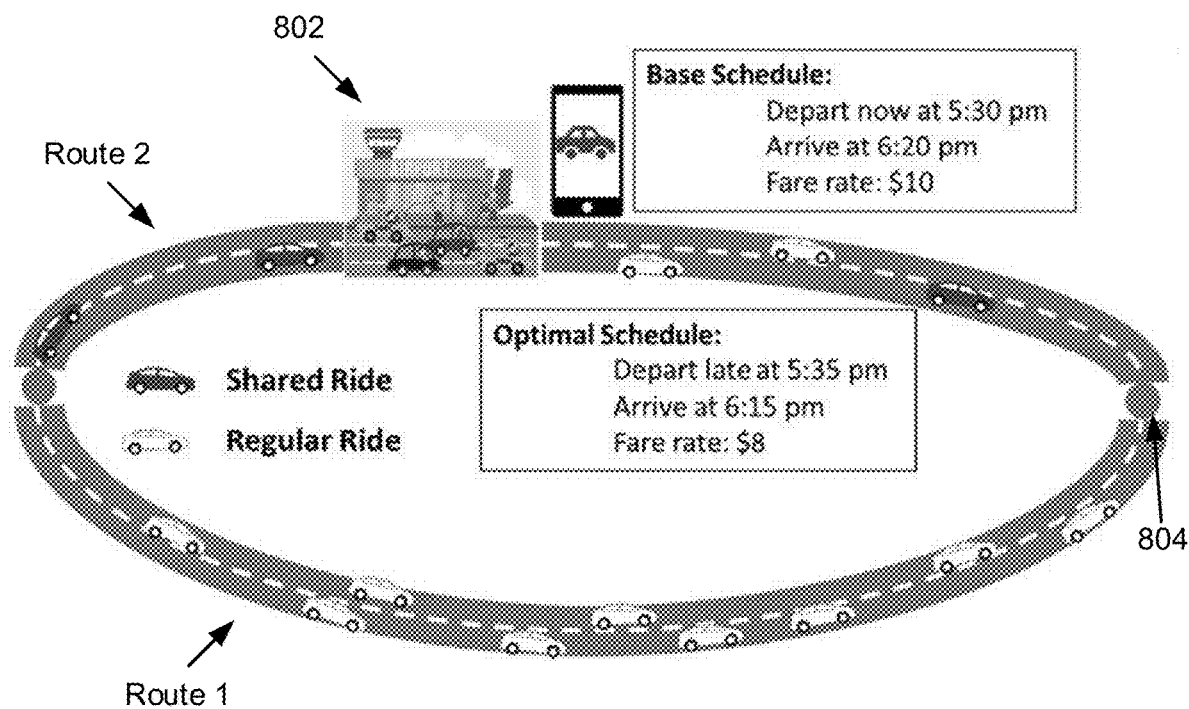
FIG. 8 is an illustration of example routes where the departure-time planning system described above may be applied.

FIG. 8 is an illustration of example routes where the departure-time planning system described above may be applied. In the example, a departure time from 802 may have a very high demand for shared rides at 5:30 pm, which, if they all departed together, would make the network very congested. In the example, if all ride requests are accepted by drivers/vehicles immediately, the estimated arrival time at another node/point 804 in the network may be as late as 6:20 µm and the fare rate may be $10. Using the technologies described above, the navigation application 112 may adjust the departure time for a shared ride from 802 and potentially decrease the congestion along route 2 thereby allowing a ride with a departure delayed to 5:35 pm to arrive at the point 804 at 6:15 pm, which is earlier than it would have arrived without a delay. Similarly, due to the shorter travel time, the fare may also be reduced to $8.

FIG. 9 is an illustration of an example graphical user interface 900 that may be provided by the navigation application 112. The interface 900 may include a graphical element 902 for receiving a starting point (e.g., manually entered or based on a location of a computing device on which the interface 900 is displayed), a graphical element 904 for receiving a destination location, and a graphical element 906 for receiving a requested departure time (e.g., "immediately" selected from a drop-down menu).

The navigation application 112 may automatically calculate and display an estimated arrival time for the requested departure time at 908 and a computed route in a map 910 for the starting point, destination, and departure time.

In some implementations, the navigation application 112 may generate a graphical area 912 describing a proposed trip modification, which may be a delayed departure, as described above. For instance, the interface 900 may display a proposed departure time 914 and estimated arrival time 916 for the proposed departure time, which may be calculated, for instance, as described in reference to FIGS. 3A and 7 above. The interface 900 may also display a graphical element 918 for receiving an acceptance or rejection of the proposed trip modification from a user. For example, the graphical element 918 may include a toggle or other selectable element that, when selected, updates the interface to indicate the acceptance. In some implementations, accepting the proposed trip modification may automatically update the map 910 (e.g., with a revised route or traffic data) or other elements of the interface 900 based on the computed attributes of the modified trip. In some implementations, although not shown, the navigation application 112 may offer an incentive via the interface 900 to accept the revised route.

In the forgoing description, for purposes of explanation, numerous specific details are set forth in order to provide a thorough understanding of the invention. It will be apparent, however, to one skilled in the art that the implementations can be practiced without these specific details. In other instances, structures and devices are shown in block diagram form in order to avoid obscuring the invention. For example, the invention is described in some implementations with reference to client devices and particular software and hardware. However, the description applies to any type of computing device that can receive data and commands, and any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some implementations can take the form of a hardware implementation, a software implementation or an implementation containing both hardware and software elements. An implementation may be implemented in software, which includes but is not limited to firmware, resident software, microcode, etc.

Furthermore, some implementations can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various implementations as described herein.

The foregoing description of the implementations has been presented for the purposes of illustration and description. It is not intended to be exhaustive or to limit the specification to the precise form disclosed. Many modifications and variations are possible in light of the above teaching. It is intended that the scope of the implementations be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, by a graphical user interface displayed on a client device, a ride request requesting transportation to a destination location via a road network;
   determining, by a navigation application communicatively coupled with the graphical user interface, an initial travel itinerary from a first location via the road network for the ride request based on real-time traffic data for the road network, the initial travel itinerary including an initial departure time;
   computing, by the navigation application, one or more adjusted travel itineraries via the road network for the ride request based on one or more postponed departure times from the first location relative to the initial departure time of the initial travel itinerary using projected traffic data for the road network at the one or more postponed departure times, the projected traffic data including an effect of the one or more postponed departure times on a projected traffic level in the road network;
   selecting, by the navigation application, an adjusted travel itinerary based on the real-time traffic data for the initial travel itinerary and the projected traffic data at the one or more postponed departure times for the one or more adjusted travel itineraries, the selected adjusted travel itinerary including a corresponding postponed departure time;
   generating, by the navigation application, a data file including the postponed departure time of the selected adjusted travel itinerary and the initial departure time; and
   customizing, by the navigation application, for display on the client device, the graphical user interface to show a graphical element representing the selected adjusted travel itinerary.

2. The computer-implemented method of claim 1, wherein receiving the ride request by the graphical user interface displayed on the client device includes:
   determining, by the navigation application, a current location of the client device using a location service of the client device;
   receiving, by the navigation application, an input identifying the destination location requested for the ride request via the graphical user interface;
   receiving, by the navigation application, a message indicating a location of a vehicle available for providing rides based on a location of a computing device associated with the vehicle; and
   determining, by the navigation application, the initial departure time based on the location of the vehicle available for providing rides and the current location of the client device.

3. The computer-implemented method of claim 1, further comprising:
   determining, by the navigation application, based on a location of one or more vehicles and a departure location associated with the ride request, a vehicle available for providing rides at the departure location and the corresponding postponed departure time; and
   transmitting, by the navigation application to a computing device associated with the vehicle available for providing rides, a notification indicating the selected adjusted travel itinerary.

4. The computer-implemented method of claim 3, wherein transmitting the notification indicating the selected adjusted travel itinerary to the vehicle available for providing rides includes:
   determining route guidance data for a particular route, the particular route including a location of the vehicle available for providing rides, the departure location associated with the ride request, and the destination location; and
   providing route guidance for the particular route to the computing device associated with the vehicle based on the route guidance data.

5. The computer-implemented method of claim 1, wherein determining the initial travel itinerary through the road network for the ride request includes:
   determining one or more routes between the first location and a second location using map data describing the road network;
   monitoring the real-time traffic data along the one or more routes;

determining the initial departure time from the first location;

estimating a first travel time of a first route of the one or more routes based on the initial departure time and the real-time traffic data; and determining the initial travel itinerary based on the estimated first travel time.

6. The computer-implemented method of claim 5, wherein:

the one or more routes include a second route, the first route corresponding to a shared ride and the second route corresponding to a non-shared ride; and determining the initial travel itinerary through the road network for the ride request includes estimating a second travel time of the second route based on the initial departure time and the real-time traffic data.

7. The computer-implemented method of claim 6, wherein computing the one or more adjusted travel itineraries through the road network for the ride request includes:

adjusting the projected traffic level of the first route based on the one or more postponed departure times of the one or more adjusted travel itineraries; and estimating one or more adjusted arrival times of the first route of the one or more adjusted travel itineraries based on the adjusted projected traffic level of the first route.

8. The computer-implemented method of claim 7, wherein estimating the one or more adjusted arrival times of the first route is further based on an unadjusted projected traffic level of the second route.

9. The computer-implemented method of claim 1, wherein computing the one or more adjusted travel itineraries through the road network for the ride request includes estimating an effect of a plurality of adjusted departure times on the projected traffic level in the road network.

10. The computer-implemented method of claim 9, wherein customizing the graphical user interface is performed in response to an estimation, based on the real-time traffic data and the projected traffic level, that the effect of the corresponding postponed departure time will be that a future traffic level in the road network will be lower than a current traffic level.

11. The computer-implemented method of claim 1, wherein computing the one or more adjusted travel itineraries through the road network for the ride request includes:

computing an estimated arrival time of the initial travel itinerary based on the real-time traffic data for the road network;

setting a departure delay;

computing an estimated adjusted arrival time of the selected adjusted travel itinerary based on the projected traffic data and the departure delay;

determining a defined arrival time offset threshold;

determining that the estimated adjusted arrival time satisfies the defined arrival time offset threshold relative to the estimated arrival time of the initial travel itinerary; and setting the corresponding postponed departure time using the departure delay.

12. A system comprising:

a processor;

a non-transitory storage device; and a navigation application executable to:

process a ride request received from a client device, the ride request requesting a ride to a destination via a road network;

determine, based on real-time traffic data for the road network, an initial travel itinerary from a first location through the road network for the ride request, the initial travel itinerary including an initial departure time;

predict, based on projected traffic data for the road network, one or more adjusted travel itineraries through the road network for the ride request based on one or more postponed departure times from the first location relative to the initial departure time of the initial travel itinerary at the one or more postponed departure times, the projected traffic data including an effect of the one or more postponed departure times on a projected traffic level in the road network;

select an adjusted travel itinerary based on the real-time traffic data for the initial travel itinerary and the projected traffic data at the one or more postponed departure times for the one or more adjusted travel itineraries, the selected adjusted travel itinerary including a corresponding postponed departure time;

generate, based on the selected adjusted travel itinerary, a notification for the selected adjusted travel itinerary indicating the corresponding postponed departure time; and transmit the notification to the client device.

13. The system of claim 12, wherein determining the initial travel itinerary through the road network for the ride request includes:

determining one or more routes between the first location and a second location using map data describing the road network;

monitoring real-time traffic along the one or more routes;

determining the initial departure time from the first location;

estimating a first travel time of a first route of the one or more routes based on the initial departure time and the real-time traffic data; and determining the initial travel itinerary based on the estimated first travel time.

14. The system of claim 13, wherein:

the one or more routes include a second route, the first route corresponding to a shared ride and the second route corresponding to a non-shared ride; and determining the initial travel itinerary through the road network for the ride request includes estimating a second travel time of the second route based on the initial departure time and the real-time traffic data.

15. The system of claim 14, wherein predicting the one or more adjusted travel itineraries through the road network for the ride request includes:

adjusting the projected traffic level of the first route based on the one or more postponed departure times of the one or more adjusted travel itineraries; and estimating one or more adjusted arrival times of the first route of the one or more adjusted travel itineraries based on the adjusted projected traffic level of the first route.

16. The system of claim 15, wherein estimating the one or more adjusted arrival times of the first route is further based an unadjusted projected traffic level of the second route.

17. The system of claim 12, wherein predicting the one or more adjusted travel itineraries through the road network for the ride request includes estimating an effect of a plurality of adjusted departure times on the projected traffic level in the road network.

18. The system of claim 17, wherein transmitting the notification to the client device is performed in response to an estimation, based on the real-time traffic data and the projected traffic level, that the effect of the corresponding postponed departure time will be that a future traffic level in the road network will be lower than a current traffic level.

19. The system of claim 12, wherein predicting the one or more adjusted travel itineraries through the road network for the ride request includes:
- computing an estimated arrival time of the initial travel itinerary based on the real-time traffic data for the road network;
- setting a departure delay;
- computing an estimated adjusted arrival time of the selected adjusted travel itinerary based on the projected traffic data and the departure delay;
- determining a defined arrival time offset threshold;
- determining that the estimated adjusted arrival time satisfies the defined arrival time offset threshold relative to the estimated arrival time of the initial travel itinerary; and
- setting the corresponding postponed departure time using the departure delay.

20. A computer-implemented method comprising:
- receiving, by a processor, a ride request requesting transportation to a destination location via a road network including determining a current location of a client device using a location service of the client device, and receiving an input identifying the destination location requested for the ride request via a graphical user interface;
- determining, by the processor, an initial travel itinerary from the current location via the road network for the ride request based on real-time traffic data for the road network, the initial travel itinerary including an initial departure time, determining the initial travel itinerary including estimating a first travel time of a first route based on the initial departure time and the real-time traffic data;
- computing, by the processor, one or more adjusted travel itineraries via the road network for the ride request based on one or more postponed departure times from the current location relative to the initial departure time of the initial travel itinerary using projected traffic data for the road network at the one or more postponed departure times, computing the one or more adjusted travel itineraries including estimating an effect of the one or more postponed departure times on a projected traffic level in the road network;
- selecting, by the processor, an adjusted travel itinerary based on the real-time traffic data for the initial travel itinerary and the projected traffic data at the one or more postponed departure times for the one or more adjusted travel itineraries, the selected adjusted travel itinerary including a corresponding postponed departure time;
- generating, by the processor, a data file including the postponed departure time of the selected adjusted travel itinerary and the initial departure time; and
- providing, by the processor, for display on the client device, the graphical user interface including graphical elements representing the initial travel itinerary and the selected adjusted travel itinerary.

\* \* \* \* \*